United States Patent [19]

Hans et al.

[11] Patent Number: 5,639,167
[45] Date of Patent: Jun. 17, 1997

[54] BEARING ASSEMBLY AND METHOD FOR MAKING A COMPONENT THEREOF

[75] Inventors: Rüdiger Hans, Niederwerrn; Elmar Mause, Schweinfurt, both of Germany

[73] Assignee: SKF GmbH, Germany

[21] Appl. No.: 610,360

[22] Filed: Mar. 4, 1996

[30] Foreign Application Priority Data

Mar. 9, 1995 [DE] Germany .................. 29504068 U

[51] Int. Cl.$^6$ .................................................. F16C 37/00
[52] U.S. Cl. ...................... 384/476; 384/512; 384/513
[58] Field of Search .................................. 384/476, 512, 384/513, 569

[56] References Cited

U.S. PATENT DOCUMENTS 5,052,828 10/1991 Ciokajlo et al. ............................ 384/476
5,054,583 10/1991 Wrzyszczynski ......................... 384/476
5,192,139 3/1993 Hiramoto et al. ........................ 384/476

*Primary Examiner*—Lenard A. Footland
*Attorney, Agent, or Firm*—Eugene E. Renz, Jr., P.C.

[57] ABSTRACT

Bearing design for the drive gear and the pump impeller of a cooling water pump for motor vehicles, with a shaft, which is installed so that it can rotate by means of two rows of balls in an outer bearing ring, and which projects on both sides beyond the outer bearing ring, characterized in that the shaft (12) is produced by the extrusion method and has a wall (20) separating chambers or compartments extending inwardly from opposing ends of the shaft, the wall is located on the drive side outside the rows of balls (24).

1 Claim, 1 Drawing Sheet

BEARING ASSEMBLY AND METHOD FOR MAKING A COMPONENT THEREOF

FIELD OF THE INVENTION

The present invention relates broadly to bearing assemblies and more specifically to a bearing assembly for a water pump for motor vehicles and to a method for making one of the components thereof.

BACKGROUND OF THE INVENTION

Cooling water pump assemblies of the type to which the present invention relates include a housing, an impeller rotatably mounted in the housing on a shaft. In the assembly shown in German Application DE 2238309, the impeller is mounted on a solid shaft and a two row ball bearing rotatably supports the shaft. The raceways for the balls are machined directly into the shaft. In this assembly, the bearing is secured against the coolant circuit by means of an axial face seal and one of the sliding rings of the seal is mounted on the outer ring of the bearing. Even though this assembly is effective for the purposes intended, it is rather expensive since it is made of plurality of solid components. Further, the conductivity of the material also is a factor in temperatures generated in the bearing.

SUMMARY OF THE INVENTION

With the above in mind, it is an object of the present invention to provide an improved easy and economical assembly and particularly to an improved shaft and bearing arrangement. To this end, in accordance with the present invention, the impeller shaft is of a predetermined configuration and is hollow and has tubular chambers extending from opposite axial ends and a solid dividing wall at the juncture of the two chambers located axially outboard of the bearing assembly. The shaft has bearing races formed in its outer periphery for a two row ball bearing, the divider wall being located axially outboard of the bearing in the region of the drive gear. The dividing wall on the drive side provides a high degree of radial rigidity for the supporting the drive gear and seals off hermetically the cooling water chamber of the pump, so that cooling water circulates under the entire bearing space and conducts heat from this area. This is desirable to provide for cool running of the bearing. The shaft may be made by extruding a solid piece of round stock into a tube and thereafter penetrating axial ends of the shaft by extrusion dies to form the chambers or recesses in the opposing axial ends of the shaft.

BRIEF DESCRIPTION OF THE DRAWINGS

These and other objects of the present invention and the various features and details of the operation and construction thereof are hereinafter more fully set forth with reference to the accompanying drawing, wherein.

DETAILED DESCRIPTION OF THE PREFERRED EMBODIMENT

Figure 2:
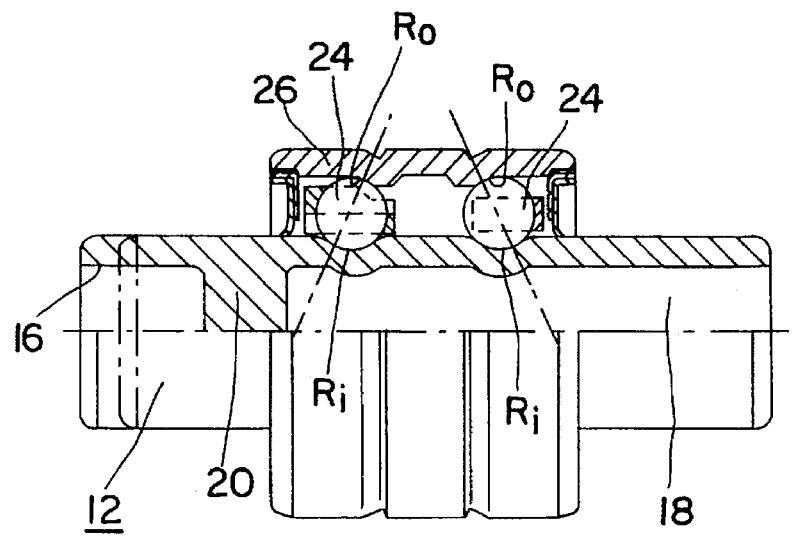
FIG. 2 is a side elevational view partly in section showing the impeller shaft and bearing assembly of the present invention.
Figure 1:
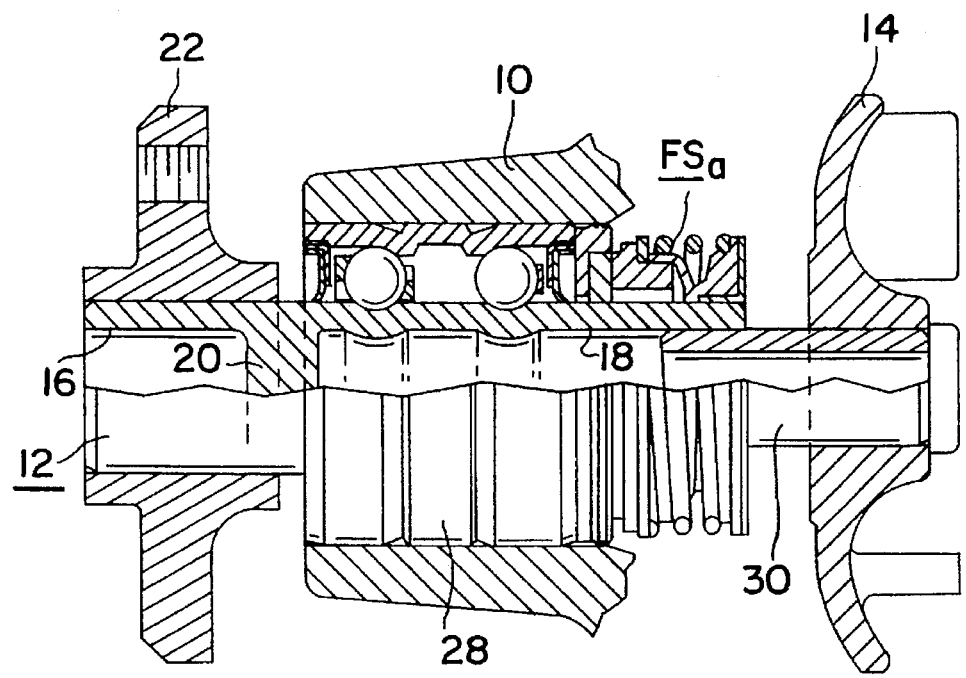
FIG. 1 is a side elevational view partly in section showing a water pump assembly incorporating a shaft and bearing assembly in accordance with the present invention.

Referring now to the drawings and particularly FIG. 1 thereof, there is fragmentarily illustrated a pump assembly incorporating the present invention basic elements of the pump assembly include a fragment of the pump housing (10) and a shaft (12) which mounts an impeller (14) at one axial end thereof, and an axial face seal $FS_a$ assembly, a bearing assembly (28) and a flanged fitting (22) for the mounting of a drive pulley not shown.

In accordance with the present invention, the shaft (12) has hollow compartments (16) and (18) extending from opposing axial ends thereof which are separated by a wall (20). As illustrated, the wall (20) is located adjacent one axial end of the bearing (28) and supports a flanged fitting (22) for the mounting of a drive pulley not shown. The outer peripheral surface of the shaft (12) is provided with axially spaced circumferentially extending inner raceways $R_i$ for balls (24). The outer ring (26) likewise has a pair of axially spaced outer raceways $R_o$ for the two rows of balls. The shaft configuration can be made by an extrusion process wherein two (2) dies penetrate a solid cylindrical blank from opposing axial ends to form the recesses or compartments (16) and (18) which resemble blind holes.

The advantages of the particular configuration and arrangement of the shaft and bearing is that the wall (20) dividing the compartments (16) and (18) provides a high degree of radial rigidity for the drive end of the shaft.

Further as illustrated, the stub shaft (30) mounting the impellor is hollow whereby a liquid coolant can circulate under the entire bearing assembly to remove heat from the bearing. This arrangement also facilitates mounting of the face seal $FS_a$.

What is claimed is:

1. Bearing design for the drive gear and the pump impeller of a cooling water pump for motor vehicles, with a shaft, which is installed so that it can rotate by means of two rows of balls in an outer bearing ring, and which projects on both sides beyond the outer bearing ring, characterized in that the shaft (12) is produced by the extrusion method and has a wall (20) separating recesses extending inwardly from opposing axial ends of the shaft, this wall being on the drive side outside the rows of balls (24).

* * * * *